(12) United States Patent
Missler et al.

(10) Patent No.: US 9,605,735 B2
(45) Date of Patent: Mar. 28, 2017

(54) DRIVE DEVICE

(71) Applicant: STABILUS GMBH, Koblenz (DE)

(72) Inventors: Marc Missler, Kadenbach (DE); Axel Knopp, Eitelborn (DE); Jan Bochen, Eitelborn (DE)

(73) Assignee: Stabilis GmbH, Koblenz (DE)

( * ) Notice: Subject to any disclaimer, the term of this patent is extended or adjusted under 35 U.S.C. 154(b) by 0 days.

(21) Appl. No.: 14/371,265

(22) PCT Filed: Jan. 8, 2013

(86) PCT No.: PCT/EP2013/050219
§ 371 (c)(1),
(2) Date: Jul. 9, 2014

(87) PCT Pub. No.: WO2013/104622
PCT Pub. Date: Jul. 18, 2013

(65) Prior Publication Data
US 2015/0000199 A1 Jan. 1, 2015

(30) Foreign Application Priority Data
Jan. 12, 2012 (DE) .................. 10 2012 100 220

(51) Int. Cl.
F16H 25/20 (2006.01)
F16F 9/36 (2006.01)
(Continued)

(52) U.S. Cl.
CPC .............. *F16H 25/20* (2013.01); *B60J 5/10* (2013.01); *E05F 15/622* (2015.01); *F16F 9/369* (2013.01);
(Continued)

(58) Field of Classification Search
USPC ............ 49/339, 340, 341, 343; 296/56, 106, 296/146.8; 188/322.16, 322.17, 322.18
See application file for complete search history.

(56) References Cited

U.S. PATENT DOCUMENTS 2,842,230 A * 7/1958 MacPherson ........ B60G 13/001
188/322.16
3,744,123 A * 7/1973 Vers .......................... F16F 9/38
188/322.17
(Continued)

FOREIGN PATENT DOCUMENTS

CN 1891964 1/2007
CN 101443522 5/2009
(Continued)

*Primary Examiner* — Jerry Redman
*Assistant Examiner* — Catherine A Kelly
(74) *Attorney, Agent, or Firm* — Cozen O'Connor

(57) ABSTRACT

A drive device comprises a housing pipe, a protection pipe, and a linear drive. The housing pipe and the protection pipe can be moved axially relative to each other in a telescopic manner. The housing pipe is arranged with the closed end thereof facing away from the protection pipe on a fixed base member or a movable component, and the protection pipe is arranged with the closed end thereof facing away from the housing pipe on the movable component or the base member. The linear drive is arranged in at least one of the housing pipe and the protection pipe, and configured to drive the housing pipe and the protection pipe such that the housing pipe and the protection pipe are axially movable relative to each other.

11 Claims, 3 Drawing Sheets

(51) Int. Cl.
  *F16F 9/38* (2006.01)
  *B60J 5/10* (2006.01)
  *E05F 15/622* (2015.01)

(52) U.S. Cl.
  CPC ............ *F16F 9/38* (2013.01); *E05Y 2800/12* (2013.01); *E05Y 2800/28* (2013.01); *E05Y 2900/546* (2013.01); *F16H 2025/204* (2013.01); *F16H 2025/2062* (2013.01); *Y10T 74/18568* (2015.01); *Y10T 74/18576* (2015.01)

(56) References Cited

U.S. PATENT DOCUMENTS

| | | | | |
|---|---|---|---|---|
| 4,305,614 A * | 12/1981 | Holka et al. | | 296/37.16 |
| 4,638,895 A * | 1/1987 | Taylor | | F16F 9/368 |
| | | | | 188/280 |
| 4,828,237 A * | 5/1989 | Neff | | B60G 15/062 |
| | | | | 188/321.11 |
| 4,921,225 A * | 5/1990 | Ludwig | | E05F 1/1292 |
| | | | | 188/269 |
| 5,062,616 A * | 11/1991 | Sommer | | B60G 17/044 |
| | | | | 188/322.17 |
| 5,188,345 A * | 2/1993 | Siegner | | A47C 3/30 |
| | | | | 188/300 |
| 5,367,826 A * | 11/1994 | Wu | | 49/343 |
| 6,216,831 B1 * | 4/2001 | Taylor | | F16F 9/20 |
| | | | | 188/280 |
| 6,336,610 B1 * | 1/2002 | Wode | | B60G 15/12 |
| | | | | 188/322.16 |
| 6,516,567 B1 * | 2/2003 | Stone et al. | | 49/343 |
| 7,107,722 B2 * | 9/2006 | Casali et al. | | 49/341 |
| 7,111,574 B2 * | 9/2006 | Slatter | | 114/255 |
| 7,244,075 B2 * | 7/2007 | Stadler | | 404/6 |
| 7,416,237 B1 * | 8/2008 | Kachouch et al. | | 296/56 |
| 7,648,189 B2 * | 1/2010 | Porat et al. | | 296/146.4 |
| 7,665,794 B2 * | 2/2010 | Kachouh | | 296/146.3 |
| 7,938,473 B2 * | 5/2011 | Paton et al. | | 296/146.8 |
| 8,237,317 B2 * | 8/2012 | Bochen et al. | | 310/66 |
| 8,485,325 B2 * | 7/2013 | Bantle | | F16F 7/09 |
| | | | | 188/322.18 |
| 8,499,905 B2 * | 8/2013 | Uchiyama | | B62K 25/08 |
| | | | | 188/266 |
| 8,689,953 B2 * | 4/2014 | Bauman | | F16F 9/38 |
| | | | | 188/322.12 |
| 2008/0251333 A1 * | 10/2008 | Knevels | | F16F 9/3221 |
| | | | | 188/322.17 |
| 2010/0037527 A1 * | 2/2010 | Bochen | | |
| 2010/0193309 A1 * | 8/2010 | Gruber | | B23P 15/10 |
| | | | | 188/322.18 |
| 2010/0263975 A1 * | 10/2010 | Vallance | | E05F 5/02 |
| | | | | 188/322.18 |

FOREIGN PATENT DOCUMENTS

| | | |
|---|---|---|
| CN | 2018818174 | 5/2011 |
| DE | 20 2007 002306 | 6/2008 |
| EP | 1 862 628 | 12/2007 |
| JP | 57-71829 | 10/1980 |
| JP | 58-104791 | 7/1983 |
| JP | 06-61543 | 8/1994 |

* cited by examiner

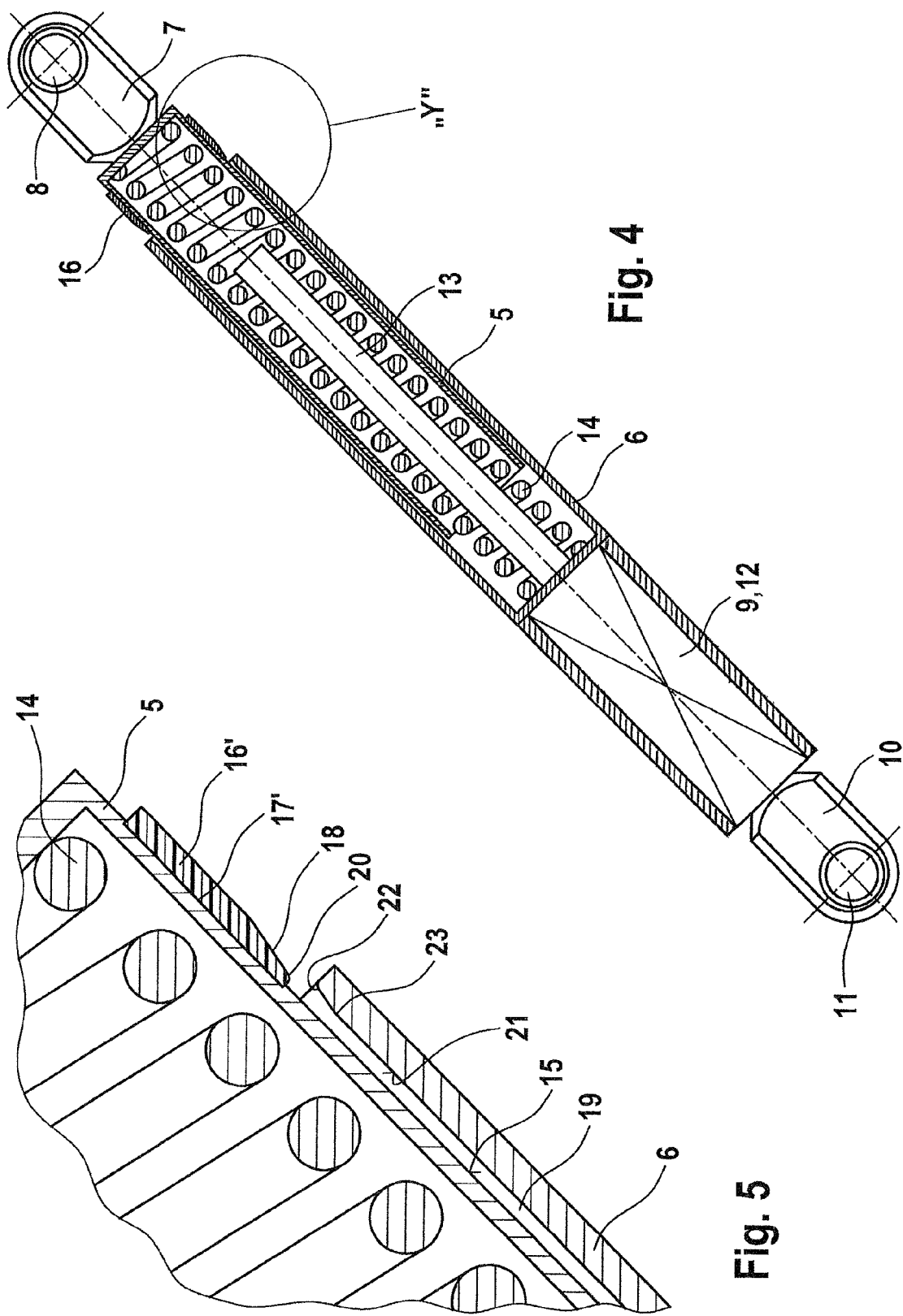

DRIVE DEVICE

CROSS-REFERENCE TO RELATED APPLICATION

This is U.S. national stage of PCT Application No. PCT/EP2013/050219, filed on Jan. 8, 2013, which claims priority to German Patent Application No. DE 10 2012 100 220.7, filed on Jan. 12, 2012, each of which is hereby incorporated in its entirety by reference.

FIELD OF INVENTION

The invention relates to a drive device, in particular for a flap of a vehicle, having a housing pipe and a protection pipe which can be moved axially relative to each other in a telescopic manner. The housing pipe is arranged with the closed end thereof, facing away from the protection pipe on a fixed base member or a movable component, and the protection pipe is arranged with the closed end thereof, facing away from the housing pipe on the movable component or the base member. The drive device also has a linear drive which is arranged in the housing pipe and/or protection pipe, and by which the housing pipe and the protection pipe can be driven so as to be axially movable relative to each other.

The protection pipe surrounded by the housing pipe, or the housing pipe surrounded by the protection pipe, is surrounded at the radially peripheral outer covering face thereof by a sealing ring. The sealing ring is closed by the annular gap formed between the housing pipe and the protection pipe in a tight manner in the retracted position of the housing pipe and protection pipe, in which position they are moved toward each other to the maximum extent.

Such drive devices can be used to open and close rear flaps on motor vehicles. In such instance, the drive device is located with a closed rear flap in the retracted position thereof, and which is normally taken up and with the rear flap open in the deployed position thereof.

DESCRIPTION OF THE RELATED ART

As a result of tolerances, an annular gap can be formed between the housing pipe and the protection pipe which are arranged in a telescopic manner with respect to each other. Such an annular gap opens outward at the mouth of the outer pipe. Dirt and moisture can thereby be introduced through the annular gap from the outer side into the linear drive, which is located inside the drive device, and damage it.

DE 20 2007 002306 U1 discloses a drive unit for actuating a motor vehicle flap substantially of the type mentioned in the introduction. In this instance, a hose seal is arranged with one end thereof on the housing of the drive and, in the retracted position, axially receives the free end of the outer pipe with the other end thereof which is in the form of a U-shaped profile-member and produces therewith a releasable connection. The annular gap between the outer pipe and inner pipe is thereby covered in an outward direction in the retracted position.

EP 1862628 A1 discloses a drive device of the type mentioned in the introduction. In this instance, there is securely arranged on the inner pipe an arrangement which has a sealing ring and into which the outer pipe is introduced in the retracted position in such a manner that it is surrounded by the sealing ring at the outer covering face thereof. The annular gap is axially closed by the arrangement with the sealing ring. In this instance, the arrangement with the sealing ring has a greater outer diameter than the outer pipe.

SUMMARY OF THE INVENTION

An object of the invention is to provide a drive device of the type mentioned in the introduction, by means of which introduction of dirt and moisture into the inner side of the housing pipe and/or protection pipe is at least substantially prevented in a simple manner such that the structural space can be kept small.

This object is achieved according to the invention in that sealing ring has an outer diameter which substantially corresponds to the inner diameter of the outer pipe of the housing pipe or protection pipe and which radially closes the annular gap in the region of the outwardly directed mouth thereof. With this arrangement, the annular gap is closed in the retracted position which is assumed in most cases so that no dirt and no moisture can be introduced via the annular gap into the inner side of the drive device and reach the linear drive and damage it.

Since the sealing ring has an outer diameter which substantially corresponds to the inner diameter of the outer pipe (housing pipe or protection pipe), the drive device does not obtain a larger outer diameter as a result of the sealing ring so that the structural space required for the drive device is kept small.

Since the sealing ring, during the telescopic movement of the drive device apart from the retracted position, is no longer in abutment with the outer pipe after leaving the retracted position, there are also no friction forces caused by the sealing ring to be overcome during the deployment movement.

The outwardly directed mouth of the annular gap may be capable of being axially covered by the sealing ring. However, it is also possible for the sealing ring to radially close the annular gap in the region of the outwardly directed mouth thereof. The region of the sealing ring covered by the outer pipe in the retracted position is thereby protected from contamination and damage by the outer pipe.

The sealing ring which has a larger outer diameter than the inner diameter of the outer pipe may comprise a resilient material so that the sealing ring is in abutment with the inner wall of the outer pipe with resilient pre-tensioning in the retracted position of the drive device, and so that the protection against the introduction of dirt and moisture is increased.

In order to minimize wear, the sealing ring preferably comprises a friction-resistant material.

The sealing ring may be arranged securely on the cylindrical covering face of the inner pipe using any appropriate means, such as, for example, adhesive-bonding or injection onto the inner pipe.

In order to prevent displacement on the inner pipe using the axial application of force during the movement of the outer pipe into the retracted position, the sealing ring may readily be inserted into a radially peripheral groove which is formed in the radially peripheral outer covering face of the housing pipe or protection pipe.

The sealing ring may be constructed at the end region thereof facing the annular gap so as to conically taper in the direction toward the end thereof facing the annular gap so that the outer pipe, during its movement into the retracted position, does not act with the front side thereof on the opposing front side of the sealing ring and damage the sealing ring. The end of the sealing ring facing the annular gap has a smaller diameter, and the region of the sealing ring remote from the annular gap has a larger diameter than the outer diameter of the annular gap.

Furthermore, the inner wall of the outer housing pipe or outer protection pipe at the mouth region thereof may also be constructed so as to expand in a conical manner in the direction toward the mouth.

Preferably, the cones on the sealing ring and housing pipe or protection pipe have substantially the same inclination angle with respect to the longitudinal axis of the drive device.

In one embodiment, the linear drive involves the linear drive having a threaded spindle on which a spindle nut is arranged, and the threaded spindle can be rotatably driven by a rotary drive which has an electric motor.

Preferably, the drive device is arranged in a water channel which is arranged on the bodywork and which is inclined with respect to the horizontal at the side of a rear flap of a motor vehicle. The closed end of the housing pipe or protection pipe on the bodywork and the closed end of the protection pipe or housing pipe are articulated to the rear flap. The rear flap is located in the closed position thereof in the retracted position of the housing pipe and protection pipe, in which position they are moved toward each other to the maximum extent. The rear flap is located in the opened position thereof in the deployed position of the housing pipe and protection pipe, in which position they are moved away from each other.

Consequently, in the event of rain falling on the motor vehicle, the water which is discharged in the water channel with the rear flap closed cannot be introduced through the annular gap into the inner side of the drive device.

With the rear flap open, the mouth region of the outer pipe, together with the majority of the drive device, is moved at least substantially out of the water channel so that the water which is discharged in the water channel also then cannot be introduced into the drive device.

In order to withstand the environmental conditions of a motor vehicle in a lasting manner, the sealing ring is preferably resistant with respect to materials such as oils, greases, cleaning agents, petroleum, diesel, brake fluid, anti-freeze and engine oil.

The sealing ring is preferably further resistant with respect to UV radiation and temperatures in the range between −40° C. and +100° C.

The sealing ring preferably withstands with respect to friction and abrasion at least 30,000 load changes of the drive device without losing its sealing function.

BRIEF DESCRIPTION OF THE DRAWINGS

Embodiments of the invention are illustrated in the drawings and are described in greater detail below. In the drawings:

FIG. 4 is a longitudinal section of a drive device in accordance with a second embodiment of the present invention; and FIG. 5 is an enlarged view of the cut-out "Y" in FIG. 4 in accordance with the second embodiment of the present invention.

DETAILED DESCRIPTION OF THE PRESENTLY PREFERRED EMBODIMENTS

Figure 1:
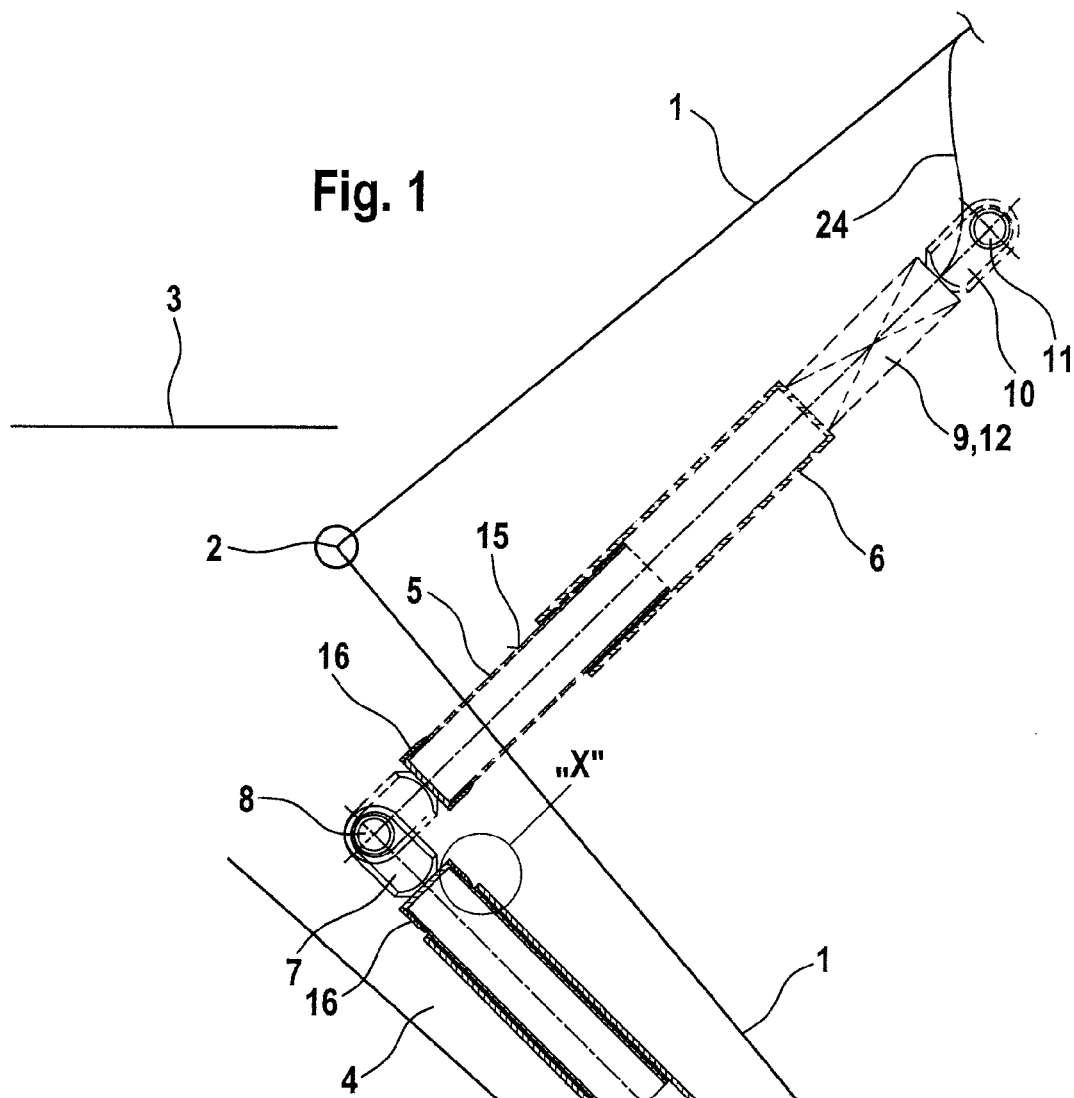
FIG. 1 is a schematic side view of a drive device in longitudinal section in the rear region of a motor vehicle in accordance with a first embodiment of the present invention.

FIG. 1 is a schematic illustration of the rear region of a motor vehicle having a rear flap 1. In this instance, the rear flap 1 is pivotably supported about a horizontal pivot axis 2 in the rear end region of the vehicle roof 3.

The rear flap 1 can be pivoted, on the one hand, into the obliquely downwardly directed closure position thereof and, on the other hand, into the obliquely upwardly opened opening position thereof.

In the bodywork of the motor vehicle there are formed two water channels 4 which each extends, when the rear flap 1 is in the closed position, along the region of the lateral edges of the rear flap 1.

For pivoting movement of the rear flap 1, there is arranged at least in one of the water channels 4 a drive device which has a housing pipe 5 and a protection pipe 6.

The housing pipe 5 has a closed end on which there is arranged a first articulation element 7 which is articulated to the bodywork using a first axle 8 with spacing from the pivot axis 2 in the upper region of the water channel 4.

On the housing pipe 5, there is arranged so as to capable of being axially displaced telescopically a protection pipe 6 whose end facing away from the housing pipe 5 is adjoined coaxially by a linear drive 9.

The end facing away from the housing pipe 5 has a second articulation element 10 which is articulated to the rear flap 1 using a second axle 11 which is arranged on the rear flap 1 with spacing from the pivot axis 2.

The linear drive 9 has a rotary drive 12 which has an electric motor and by means of which a spindle nut which is not illustrated and which is arranged on a threaded spindle 13 (shown in FIG. 4) can be rotatably driven. The rotary drive 12 is connected via a cable 24 to an electrical energy source in the motor vehicle, the cable extending through the rear flap 1.

The threaded spindle 13 is guided coaxially through the protection pipe 6 and the housing pipe 5 and securely connected at the end thereof remote from the rotary drive 12 to the end of the housing pipe 5 having the first articulation element 7.

A pre-tensioned helical compression spring 14 (shown in FIGS. 4 and 5) surrounds the threaded spindle 13 with play and is supported with one end thereof on the closed end of the housing pipe 5 and with the other end thereof on the rotary drive 12.

Figure 2:
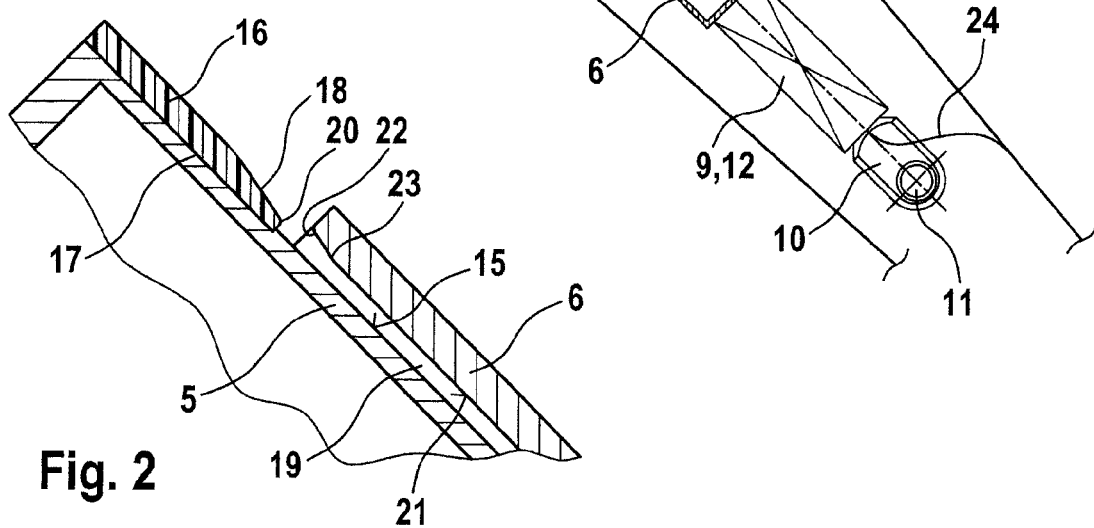
FIG. 2 is an enlarged view of the cut-out "X" in FIG. 1 in accordance with the first embodiment of the present invention.
Figure 3:
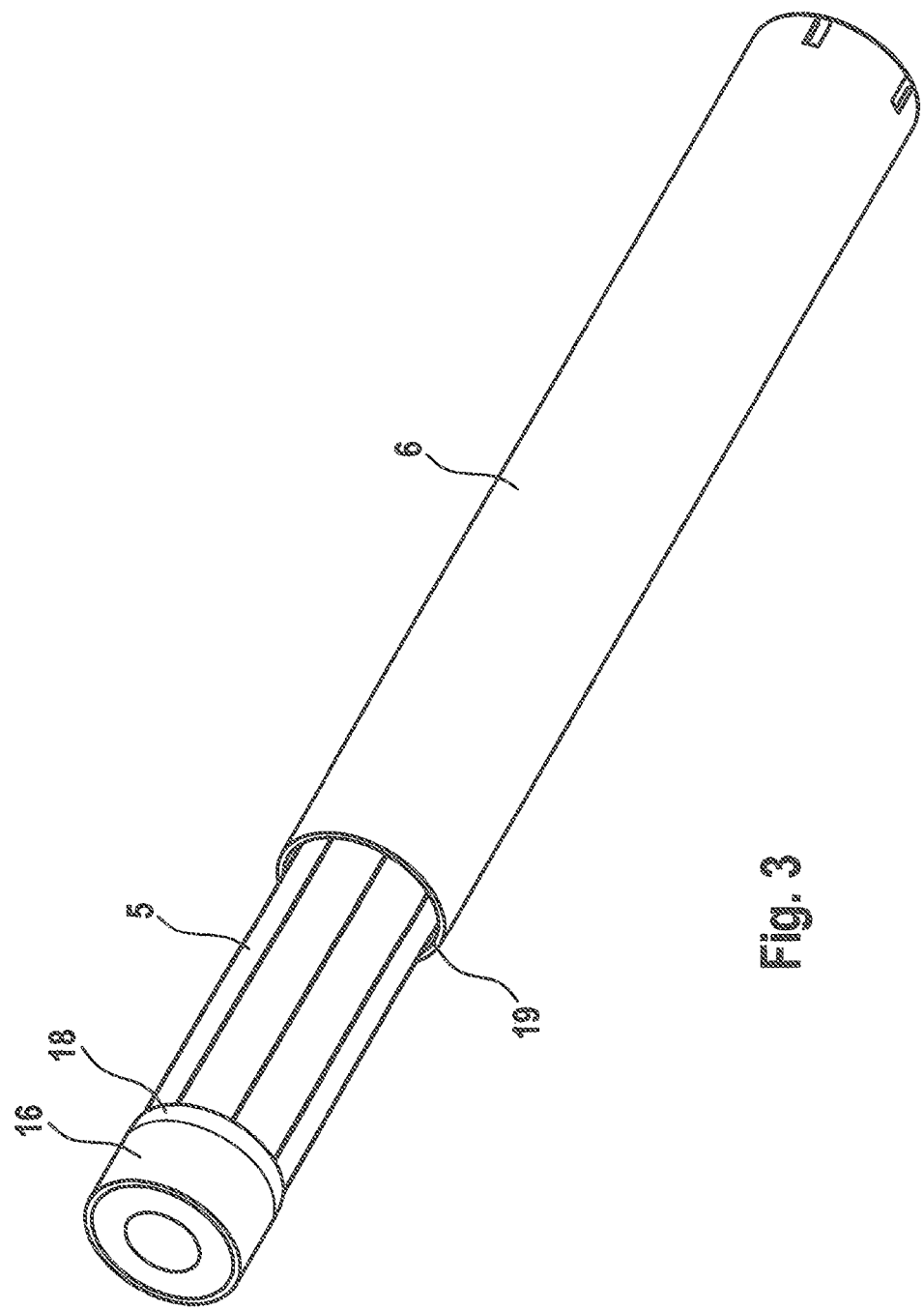
FIG. 3 is a perspective view of the housing pipe and protection pipe of the drive device according to FIG. 1 in accordance with the first embodiment of the present invention.

For the sake of clarity, the threaded spindle 13 and the helical compression spring 14 are not illustrated in FIGS. 1 and 2.

In the end region of the housing pipe 5 close to the first articulation element 7, the radially peripheral outer covering face 15 thereof is surrounded by a sealing ring 16, 16' which is inserted into an annular groove 17, 17' which is formed in a radially peripheral manner in the covering face 15.

The sealing ring 16, 16' comprises a friction-resistant resilient material, such as, for example, TPE (thermoplastic elastomer).

In the retracted position with the rear flap 1 closed, the end region 18 facing the protection pipe protrudes into an annular gap 19 formed between the housing pipe 5 and the protection pipe 6 and closes it toward the outer side.

The sealing ring 16, 16' has an outer diameter which is greater than the inner diameter of the protection pipe 6.

In this instance, the end region 18 of the sealing ring 16, 16' is constructed in the direction toward the end 20 thereof facing the annular gap 19 so as to taper conically to such an extent that, at the end the diameter of the sealing ring 16, 16' is smaller than the inner diameter of the protection pipe 6.

Accordingly, the inner wall 21 of the protection pipe 6 is constructed so as to expand in a conical manner in the direction toward the mouth 22 at the mouth region 23 thereof.

In the retracted position, the sealing ring 16, 16' is in abutment with the conical mouth region 23 of the protection pipe 6 with resilient pre-tensioning with the conical end region 18 thereof and closes the annular gap 19 toward the outer side.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drive device comprising:
a housing pipe and a protection pipe that can be moved axially relative to each other in a telescopic manner, wherein the housing pipe having a closed end, wherein the housing pipe is arranged with the closed end of the housing pipe on a fixed base member, wherein the closed end of the housing pipe facing away from the protection pipe and the protection pipe is arranged with a closed end of the protection pipe on a movable component,
wherein the closed end of the protection pipe faces away from a housing,
a linear drive arranged in the housing pipe, and configured to drive the housing pipe and the protection pipe such that the housing pipe and the protection pipe are axially movable relative to each other,
wherein the protection pipe is surrounded by the housing pipe, or the housing pipe is surrounded by the protection pipe, and a sealing ring surrounds a radially peripheral outer covering face of an inner one of the protection pipe and the housing pipe,
wherein the sealing ring closes an annular gap formed between the housing pipe and the protection pipe in a retracted position of the housing pipe and protection pipe by protruding into the annular gap, the retracted position is the position in which the housing pipe and the protection pipe are moved toward each other to a maximum extent, and
wherein the sealing ring has an outer diameter which substantially corresponds to an inner diameter of an outer one of the housing pipe or the protection pipe and radially closes the annular gap in a region of an outwardly directed mouth of the outer one of the housing pipe and the protection pipe.

2. The drive device of claim 1, wherein the sealing ring is inserted into a radially peripheral annular groove that is formed in the radially peripheral outer covering face of the housing pipe.

3. The drive device of claim 1, wherein the sealing ring has an end region facing the annular gap, the end region being conically tapered toward an end of the sealing ring facing the annular gap, wherein the end of the sealing ring facing the annular gap has a smaller diameter, and wherein a region of the sealing ring remote from the annular gap has a larger diameter than the outer diameter of the annular gap.

4. The drive device of claim 1, wherein an inner wall of the outer one of the housing pipe or the protection pipe at the region of the outwardly directed mouth is constructed so as to expand in a conical manner in the direction toward the mouth.

5. The drive device of claim 1, wherein the sealing ring comprises a resilient material.

6. The drive device of claim 1, wherein the sealing ring comprises a friction-resistant material.

7. The drive device of claim 1, wherein the linear drive has a threaded spindle on which a spindle nut is arranged, wherein the threaded spindle or the spindle nut is capable of being rotatably driven by a rotary drive having an electric motor.

8. The drive device of claim 1,
wherein the fixed base member is a bodywork of a motor vehicle,
wherein the movable component is a rear flap of the motor vehicle,
wherein the drive device is arranged in a water channel of the bodywork of a motor vehicle and inclined with respect to the horizontal at a side of the rear flap of the motor vehicle,
wherein the closed end of the housing pipe is articulated to the bodywork and the closed end of the protection pipe is articulated to the rear flap,
wherein the rear flap is located in the closed position in the retracted position of the housing pipe and protection pipe,
wherein the housing pipe and the protection pipe are moved toward each other to the maximum extent in the retracted position,
wherein the rear flap is located in an opened position in a deployed position of the housing pipe and protection pipe,
wherein the housing pipe and the protection pipe are moved away from each other in the deployed position, and
wherein the rear flap is pivotable between an obliquely downwardly directed closed position and an obliquely upwardly directed opened position.

9. A drive device configured to be affixed between a fixed base member and a moveable component comprising:
a first pipe having an open end and a closed end;
a second pipe arranged coaxially outside the first pipe, the second pipe having an open end and a closed end and configured to be moved axially relative to the first pipe in a telescopic manner, the closed end of the second pipe arranged opposite the closed end of the first pipe;
a linear drive arranged in the first pipe or the second pipe and configured to drive the first pipe and the second pipe axially relative to each other; and
a sealing ring arranged on a radially peripheral outer covering face of the first pipe proximate to the closed end of first pipe a portion of the sealing ring having an outer diameter that substantially corresponds to an inner diameter of the second pipe, wherein the sealing ring closes an annular gap formed between the first pipe and the second pipe in a retracted position of the first pipe and the second pipe by protruding into the annular gap formed between the first pipe and the second pipe, the retracted position is the position in which the first pipe and the second pipe are moved toward each other to a maximum extent, and wherein the sealing ring closes the annular gap between the first pipe and the second pipe at the open end of the second pipe.

10. A drive device comprising:

a housing pipe and a protection pipe that can be moved axially relative to each other in a telescopic manner, wherein the protection pipe has a closed end, wherein the protection pipe is arranged with the closed end of the protection pipe at a fixed base member, wherein the closed end of the protection pipe faces away from the housing pipe and the housing pipe is arranged with a closed end of the housing pipe on a movable component, wherein the closed end of the housing pipe faces away from the protection pipe, a linear drive arranged in the housing pipe, and configured to drive the housing pipe and the protection pipe such that the housing pipe and the protection pipe are axially movable relative to each other, wherein the protection pipe is surrounded by the housing pipe, or the housing pipe is surrounded by the protection pipe, and a sealing ring surrounds a radially peripheral outer covering face of an inner one of the protection pipe and the housing pipe, wherein the sealing ring closes a annular gap formed between the housing pipe and the protection pipe in a retracted position of the housing pipe and protection pipe by protruding into the annular gap in the retracted position in which the housing pipe and the protection pipe are moved toward each other to a maximum extent, and wherein the sealing ring has an outer diameter which substantially corresponds to an inner diameter of an outer one of the housing pipe or protection pipe and radially closes the annular gap in a region of an outwardly directed mouth of the outer one of the housing pipe or the protection pipe.

11. The drive device of claim 10, wherein the sealing ring is inserted into a radially peripheral annular groove that is formed in the radially peripheral outer covering face of the housing pipe or the protection pipe.

* * * * *